US007684166B2

(12) United States Patent
Donati et al.

(10) Patent No.: US 7,684,166 B2
(45) Date of Patent: Mar. 23, 2010

(54) SURGE VOLTAGE PROTECTION DEVICE WITH IMPROVED DISCONNECTION AND VISUAL INDICATION MEANS

(75) Inventors: Michel Georges Jean Donati, Cieutat (FR); Alain Rene Robert Lagnoux, Rabastens de Bigorre (FR); Bertrand Brua, Capvern-les-Bains (FR)

(73) Assignee: ABB France, Rueil-Malmaison Cedex (FR)

( * ) Notice: Subject to any disclaimer, the term of this patent is extended or adjusted under 35 U.S.C. 154(b) by 457 days.

(21) Appl. No.: 11/568,090

(22) PCT Filed: Apr. 19, 2004

(86) PCT No.: PCT/FR2004/000960

§ 371 (c)(1),
(2), (4) Date: Jun. 8, 2007

(87) PCT Pub. No.: WO2005/112211

PCT Pub. Date: Nov. 24, 2005

(65) Prior Publication Data

US 2008/0043395 A1 Feb. 21, 2008

(51) Int. Cl.
*H02H 3/22* (2006.01)
*H02H 3/00* (2006.01)
*H02H 5/04* (2006.01)

(52) U.S. Cl. ........................ 361/118; 361/103; 361/104

(58) Field of Classification Search ................. 361/118
See application file for complete search history.

(56) References Cited

U.S. PATENT DOCUMENTS 6,430,019 B1 8/2002 Martenson et al.

FOREIGN PATENT DOCUMENTS

| | | |
|---|---|---|
| DE | 4334101 | 4/1994 |
| EP | 0867896 | 9/1998 |
| EP | 0987803 | 3/2000 |

*Primary Examiner*—Fritz M. Fleming
*Assistant Examiner*—Lucy Thomas
(74) *Attorney, Agent, or Firm*—Jason A. Bernstein; Barnes & Thornburg LLP

(57) ABSTRACT

A device for protecting an electrical system against surge voltages, comprising one or more protection components (10), means (20) for disconnecting the protection component (10) and means (30) for visually indicating the state of the component (10), operationally connected to the disconnection means (20) and comprising at least one control part (40) and at least one means (50) for indicating the state of the protection component (10), combined with the control part (40), whereby the relative arrangement of the control part (40) and the disconnection means (20) is such that, when the disconnection means are opened (20), the disconnection means release the control part (40), thereby allowing the control part to move.

24 Claims, 4 Drawing Sheets

SURGE VOLTAGE PROTECTION DEVICE WITH IMPROVED DISCONNECTION AND VISUAL INDICATION MEANS

PRIORITY CLAIM

This patent application is the U.S. National Phase of International Application No. PCT/FR2004/000960, filed Apr. 19, 2004, the disclosure of which is incorporated herein by reference in its entirety.

FIELD OF THE INVENTION

The present invention relates to devices for protecting electrical installations and equipment against transient electrical voltage surges.

More particularly, the present invention relates to a device for protecting an electrical installation against voltage surges, the device comprising:

- at least one protection component;
- disconnector means for disconnecting the protection component, adapted to disconnect it from the electrical installation and suitable for moving between a closed position in which the protection component is connected, and an open position in which the protection component is disconnected; and
- indicator means for indicating the state of the protection component, functionally connected to the disconnector means, and comprising:
  - at least one control part distinct from the disconnector means and suitable for moving under the dependency thereof; and
  - at least one indicator for indicating the state of the protection component and associated with the control part in such a manner that the indicator indicates whether the protection component is in operation or disconnected, as a function of the position of the control part.

BACKGROUND OF THE INVENTION

Devices for protecting electrical installations are commonly used in particular for protecting electrical or electronic apparatus against surges that can be generated by lightning discharges, for example.

In general, such devices comprise an active portion formed by one or more protection components, such as a varistor or a spark gap.

Varistors are components commonly used for protecting electrical installations or equipment against transient voltage surges.

When a surge occurs within the installation, the varistor is subjected to a current shock that has the effect of degrading it and causing it to heat up, making thermal disconnection thereof necessary.

The degradation of a varistor is difficult or impossible to predict, insofar as it depends not only on the number of current shocks the varistor has suffered over its lifetime, but also on their amplitude.

Consequently, it is difficult to predict, a priori, the lifetime and the degree of aging of a varistor, and users often discover a posteriori that the varistor has been destroyed, such that the installation runs the risk of operating without any protection during some length of latency time.

In order to enable a defective varistor to be identified quickly and thus reduce the above-mentioned latency time, it is known to fit each varistor with indicator means suitable for informing a third party that the varistor is out of operation.

The varistors that are generally encountered are thus associated with disconnector means adapted to disconnect a varistor once it is in a degraded state and before it heats up excessively, which disconnector means are functionally connected to means for indicating the state of the varistor, that are generally actuated themselves by the disconnector means, and that serve to inform a third party whether the varistor is in operation or is disconnected.

The indicator means can thus be in the form of a slider associated with an indicator and suitable for moving in translation under drive from the disconnector means so that its position indicates the state of the varistor, with this being done by putting the indicator, e.g., a colored screen, in register with a viewing window formed in the housing of the protection device.

In known protection devices, the slider and the indicator are either secured to the disconnector means, in particular a disconnector blade, or else they are independent therefrom, while being controlled and actuated thereby.

In any event, moving the disconnector means towards their open position causes the slider to move in a manner that is controlled or guided by the disconnector means or by independent guide means.

Unfortunately, it can happen that the slider or the indicator is impeded in its movement, in particular when the slider and/or the indicator are poorly dimensioned or if the guide means are defective, thus leading to the slider being poorly guided.

In this situation, the slider and/or the indicator can impede or even prevent disconnection of the varistor. The varistor then remains connected and the indicator means do not indicate any abnormality in spite of the varistor being badly degraded, and in danger of causing a fire on being overheated.

In addition, configurations in which the slider and/or the indicator are actuated and moved under control by the disconnector means generally require the component parts to be accurately dimensioned, firstly so as to avoid slack arising between the parts, and secondly to avoid any risk of the disconnector and/or indicator system jamming.

In addition, in order to avoid the slider and/or the indicator slowing down disconnection, disconnector blades are generally designed in such a manner as to present a strong spring effect suitable for overcoming any braking effect exerted by the slider and/or the indicator.

Nevertheless, such a measure presents the drawback of weakening the soldered connection between the disconnector blade and the corresponding electrode of the varistor.

In general, the mechanical complexity of known devices requires the operations of manufacturing the parts to be very well controlled, thereby significantly increasing the cost of manufacturing such devices.

The above remarks naturally apply to devices that use other protection components, in particular spark gaps, in which it can be necessary in certain applications to make use of thermal disconnections.

It can thus be seen that there is a need to make a voltage surge protection device that, while being simple and inexpensive in design, is nevertheless capable, in the most reliable and effective manner possible, of disconnecting the protection component in the installation to be protected, and of simultaneously indicating to a third party that the protection component in question is out of operation.

SUMMARY OF THE INVENTION

Consequently, the features provided by the invention seek to provide a remedy to the various drawbacks listed above and to propose a novel device for protecting electrical installations against voltage surges, which device guarantees disconnection of the protection component in a manner that is particularly reliable and fast.

One feature of the invention seeks to provide a novel device for protecting electrical installations against voltage surges, which device is capable of indicating the state of the protection component in a manner that is simple, reliable, and immediate.

Another feature of the invention seeks to provide a novel device for protecting electrical installations against voltage surges, which device is of a design that is particularly simple and inexpensive.

Another feature of the invention seeks to provide a novel device for protecting electrical installations against voltage surges, which device requires only a limited number of parts both to obtain the connection and disconnection function, and to obtain the indication function.

Another feature of the invention seeks to provide a novel device for protecting electrical installations against voltage surges, which device enables the states of a plurality of protection components connected in parallel to be indicated simultaneously and distinguishably.

Another feature of the invention seeks to provide a novel device for protecting electrical installations against voltage surges, which device enables an indication about the state of the protection component to be delivered remotely.

The features provided by the invention are achieved with the help of a device for protecting an electrical installation against voltage surges, the device comprising:

- at least one protection component;
- disconnector means for disconnecting the protection component, adapted to disconnect it from the electrical installation and suitable for moving between a closed position in which the protection component is connected, and an open position in which the protection component is disconnected; and
- indicator means for indicating the state of the protection component, functionally connected to the disconnector means, and comprising:
  - at least one control part distinct from the disconnector means and suitable for moving under the dependency thereof; and
  - at least one indicator for indicating the state of the protection component and associated with the control part in such a manner that the indicator indicates whether the protection component is in operation or disconnected, as a function of the position of the control part;

the protection device being characterized in that the control part and the disconnector means are relatively disposed in such a manner that during opening of the disconnector means the disconnector means release the control part thus allowing it to move.

BRIEF DESCRIPTION OF THE DRAWINGS

Other features and advantages of the invention appear more clearly and can be seen in greater detail on reading the following description made with reference to the accompanying drawings, given purely by way of non-limiting illustration, and in which.

DESCRIPTION OF THE INVENTION

Figure 1:
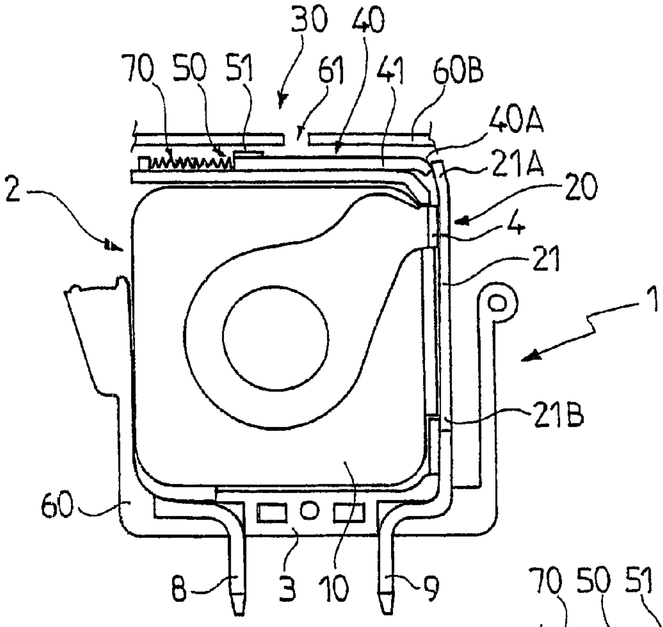
FIG. 1 is a section view of a device in accordance with the invention for providing protection against voltage surges, the device being shown with its protection component in service.

The device of the invention for providing protection against voltage surges is designed to be connected in parallel with the electrical equipment or the installation to be protected. The term "electrical installation" refers to any type of apparatus or network that might be subjected to voltage disturbances, in particular to transient voltage surges due to lightning. Under such circumstances, the device is thus formed by a lightning arrestor.

The device of the invention for providing protection against voltage surges is advantageously designed to be placed between one of the phases of the installation that is to be protected and ground.

Without going beyond the ambit of the invention, it is also possible to envisage that instead of being connected in parallel between one of the phases and ground, the device is connected between neutral and ground, between a phase and neutral, or between two phases (for differential protection).

The protection device comprises at least one protection component 10 forming the active portion of a lightning arrestor, for example, that is to protect the electrical installation.

In the description below, it is considered that each protection component 10 present in the device is formed by a varistor, it being understood that the use of a varistor is mentioned purely by way of example and does not constitute any kind of limitation on the invention.

The protection device provided by the invention comprises at least one varistor 10, e.g., one or two varistors 10, disconnector means 20 for each varistor, which disconnector means are sensitive to the degree of varistor aging and are adapted to disconnect each varistor individually from the electrical installation when the varistor is found to be in a degraded state.

The protection device provided by the invention also comprises indicator means 30 for indicating the state of each varistor 10 and functionally connected to the disconnector means 20.

Figure 2:
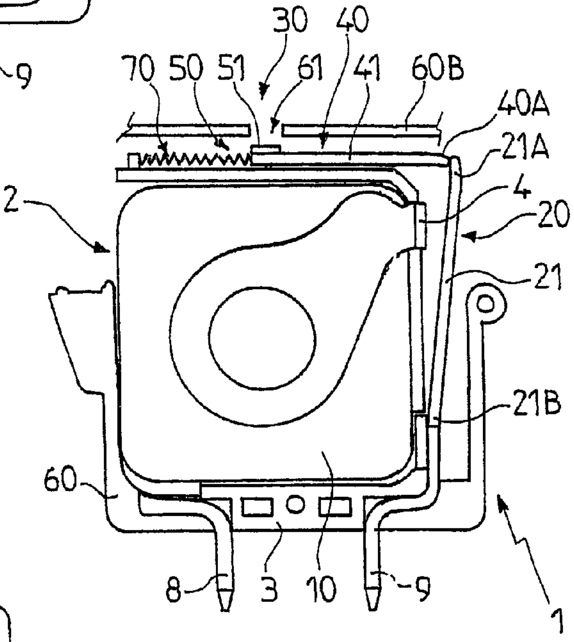
FIG. 2 is a section view of the protection device shown in FIG. 1 when the connection component is disconnected.
Figure 3:
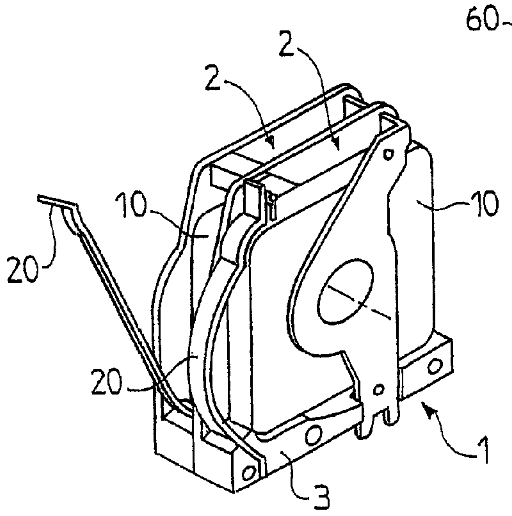
FIG. 3 is a perspective view of an exemplary protection device in accordance with the invention provided with two varistors connected in parallel.

Advantageously, the protection device is formed by a protection cell 1 capable of having one or more modules 2, each containing a varistor 10 (FIGS. 1, 2, and 3). Each module 2 advantageously comprises a base 3 of an electrically insulating material, a varistor 10, two electrically conductive electrodes 4 constituting the poles of the varistor 10, and disconnector means 20.

Figure 7:
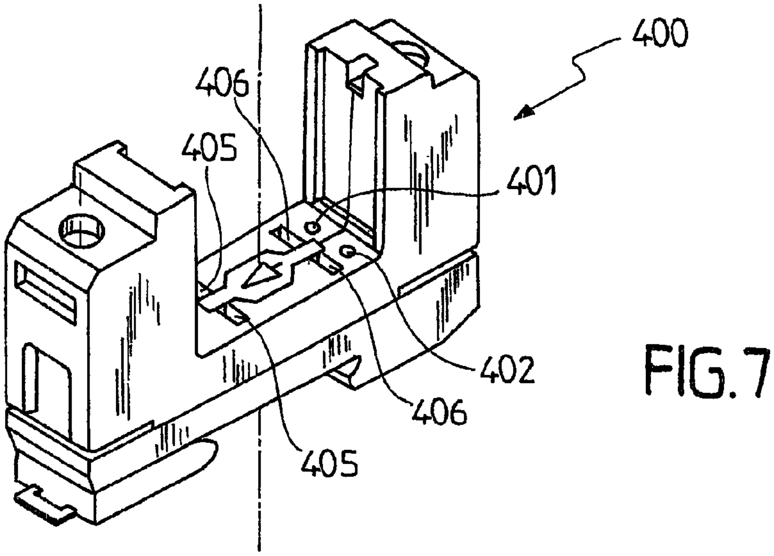
FIG. 7 is a perspective view of a socket suitable for having a protection cell in accordance with the invention plugged thereto.

In unpluggable versions of the device shown in FIGS. 1 and 2, each module 2 is adapted to be electrically connected to a socket 400 (FIG. 7) via connection pins 8, 9 for inserting in orifices 405, 406 provided in the socket 400.

Thus, one of the poles of the varistor 10 is directly connected to a connection pin 8, the other pole of the varistor being connected to an electrode 4 which is soldered to the disconnector means 20 that are in permanent electrical contact with the other connection pin 9.

The disconnector means 20 are preferably formed by a thermal disconnector, such as, for example, a disconnector blade 21 in thermal and electrical contact with the associated varistor 10, so that any heating of the varistor associated with the varistor reaching the end of its lifetime leads to the disconnector blade 21 opening, thereby isolating the varistor from the lines to be protected.

The disconnector means 20 are thus suitable for moving between a "closed" position in which the varistor 10 is connected to the electrical installation or the network, and an open position in which the varistor 10 is disconnected from the electrical installation. These two positions are shown in FIGS. 1 and 2.

Advantageously, the disconnector blade 21 extends between two ends 21A, 21B, one of the ends 21A preferably being held to one of the electrodes 4 by solder that melts on being heated. The end 21A of the disconnector blade 21 is thus preferably soldered while under stress so that when the varistor 10 reaches the end of its lifetime, it heats up and causes the solder to melt and break, so that once broken it releases the disconnector blade 21.

Because of its intrinsic elasticity, the disconnector blade 21, and specifically the end 21A of the disconnector blade 21, then moves away from the electrode 4, while the other end 21B remains stationary, as shown in FIG. 2.

There follows a detailed description of the structure of the indicator means 30.

The indicator means 30 are adapted to inform a third party about the state of the varistor(s) contained in the protection cell 1. These indicator means 30 are functionally connected to the disconnector means 20, i.e., there are intermediate means enabling the position of the disconnector means 20 to be associated with the indication provided by the indicator means 30.

According to the invention, the indicator means 30 comprise, for each protection cell 1, a control part 40 that is distinct from the disconnector means 20 and that is suitable for moving under the dependency thereof. This control part 40 advantageously provides the functional connection between the disconnector means 20 and the indicator means 30.

The indicator means 30 also comprise an indicator 50 for indicating the state of the varistor 10 associated with the control part 40, such that, as a function of the position of the control part 40, the indicator 50 indicates whether the varistor 10 is in service or is disconnected.

According to the invention, the control part 40 and the disconnector means 20 are disposed relative to one another in such a manner that, when the disconnector means 20 open, they release the control part 40, thus allowing it to move freely, i.e., in a manner that is not controlled by the disconnector means 20.

Once released, the control part 40 is thus free to move, i.e., it is neither actuated nor guided in its movement by the disconnector means 20.

In particularly advantageous manner, while the disconnector means 20 are in the closed position, they are mounted in such a manner as to form an abutment against the control part 40. Thus, the control part 40 advantageously includes a bearing zone 40A which, while the disconnector means 20 are in the closed position, comes to bear thereagainst (FIG. 1).

The disconnector blade 21 thus performs three functions:

in normal operation, it provides an electrical connection to the varistor 10;

at the end of the lifetime of the varistor 10, it serves to disconnect the varistor; and finally, it also serves to release the indicator means 30, thus leading to a change in the indication concerning the state of the varistor 10.

Advantageously, the control part 40 and the disconnector means 20 are disposed in such a manner that while the disconnector means 20 are in the closed position (FIG. 1), the control part 40 is under resilient stress and comes to bear against the disconnector means 20, in particular via its bearing zone 40A, thereby exerting drive stress on the disconnector means 20, urging them towards the open position.

The indicator means 30 thus perform two functions:

firstly, via the indicator 50, they serve to provide an indication concerning the state of the varistor 10; and secondly, via the control part 40, they contribute to disconnecting the varistor 10 by urging the disconnector means 20, and in particular the disconnector blade 21, towards the open position.

Such a configuration thus serves to bring forward and make secure the disconnection of the protection component. It also makes it possible to use a disconnector blade 21 that presents only a moderate spring effect, and thus to reduce the risk of the thermal release solder being weakened mechanically.

The design of the protection device of the invention, and in particular the way the indicator means 30 for indicating the state of the varistor are configured, thus makes it possible to ensure that the protection component is disconnected quickly and reliably, by virtue of the small number of parts that co-operate with one another and the limited number of points of contact between these parts. This reliability is further increased by the fact that the indicator means 30 are separate from the disconnector means s20.

In addition, because of the simultaneous or almost simultaneous movement of the indicator means 30 and of the disconnector means 20, a third party can see very quickly that a varistor has been disconnected.

In particularly advantageous manner, and as shown in FIGS. 1 and 2, the control part 40 is formed by a slider 41 of electrically insulating material that is suitable for moving in a substantially rectilinear direction F.

Advantageously, the front portion 41A of the slider 41 is specially designed to bear against the disconnector means 20, firstly when they are in the closed position, and secondly while they are opening, so that the slider 41 is continuously in contact with the disconnector means 20.

In the exemplary embodiment of the invention shown in FIGS. 1 and 2, the indicator means 30 are advantageously formed by mechanical means mounted in a housing 60, which housing also contains the varistor 10.

In particularly advantageous manner, the indicator means 30 also comprise resilient means 70 such as a spring adapted to exert a return force on the control part 40 and responsible for moving it.

As shown in FIGS. 1 and 2, the resilient means 70 is preferably interposed between the control part 40 against which it bears resiliently, and a stationary abutment, e.g., formed by one of the inside walls of the housing 60.

The resilient means 70 is thus advantageously adapted to occupy a compressed position when the control part 40 is stressed longitudinally, i.e., in a direction that is substantially parallel to the travel direction F and a rest position, on the control part 40 being released from the disconnector means 20 (FIG. 2). The resilient means 70 thus constitutes prestress means acting on the control part 40.

In the exemplary embodiment shown in FIGS. 1 and 2, the slider 41 extends longitudinally in the direction F, and is preferably sufficiently rigid for its front portion 41A to be capable of bearing firmly against the disconnector means 20, and more particularly against the end 21A of the disconnector blade 21.

When the solder breaks, under the effect of the varistor 10 heating, the end 21A of the disconnector blade 21 moves in the direction F and thus ceases to constitute an obstacle or an abutment against the control part 40. The initially compressed resilient means 70 then tends to relax (FIG. 2), thereby driving the slider 41 to move in the direction F. As it moves, the slider 41, still bearing against the end 21A of the disconnector blade 21, tends to force the blade towards its open position, thereby actively contributing to disconnecting the protection component. In particularly advantageous manner, the return force exerted by the resilient means 70 on the end 21A of the disconnector blade 21 is preferably greater than the opposing resistance of the disconnector blade 21 so as to constrain the blade to move further away from the electrode 4.

In this exemplary embodiment of the invention, the indicator 50 is advantageously formed by an indicator member, preferably by a panel 51, e.g., a rectangular panel that is preferably disposed on the slider 41. The panel 51 may be constituted by a piece of insulating plastics material, e.g., stuck to the slider 41, however it could equally well be formed merely by a colored strip painted on the slider 41. The panel 51 is more advantageously disposed in such a manner as to move simultaneously with the control part 40 so as to be in register with a window 61 formed through one of the faces 60B of the housing 60 situated remote from the base 3 so as to obtain a different visual appearance through the window 61 depending on the position of the control part 40.

Thus, when the disconnector means 20 are in the closed position (FIG. 1), the resilient means 70 is compressed and the panel 51 is in a position where it is offset away from the window 61, such that in this configuration it cannot be seen from the outside. Thus, when looking through the window 61, it is the slider 41 that is seen and, by way of example, it may present a green color to inform third parties that the varistor is in operation.

In contrast, when the disconnector means 20 are in the open position, as shown in FIG. 2, the panel 51 lies in the field of the window 61. It can then be seen from the outside, and preferably presents a colored appearance, e.g., red, informing third parties that the varistor is disconnected.

In a second exemplary embodiment of the invention, shown in FIG. 3, the device comprises a protection cell 1 having first and second varistors 10 connected in parallel and respectively associated with first and second disconnector means 20A and 20B.

Figure 4A:
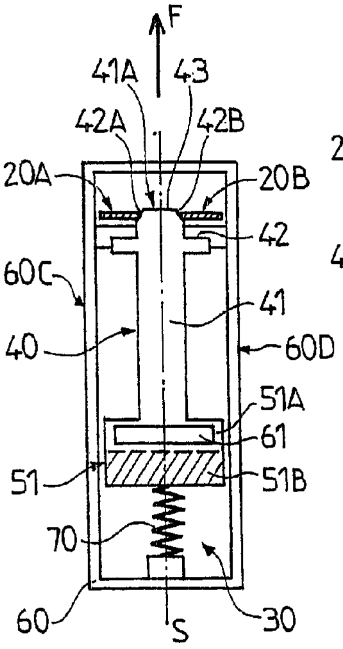
FIG. 4*a* is a diagrammatic view showing a system for indicating the state of two varistors connected in parallel respectively when both varistors are in service.
Figure 4B:
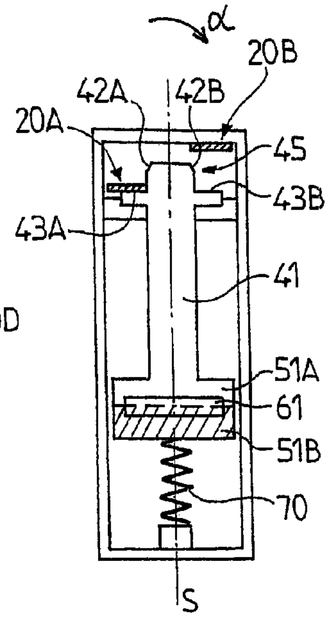
FIG. 4*b* is a diagrammatic view showing a system for indicating the state of two varistors connected in parallel respectively when only one of the varistors is in service.
Figure 4C:
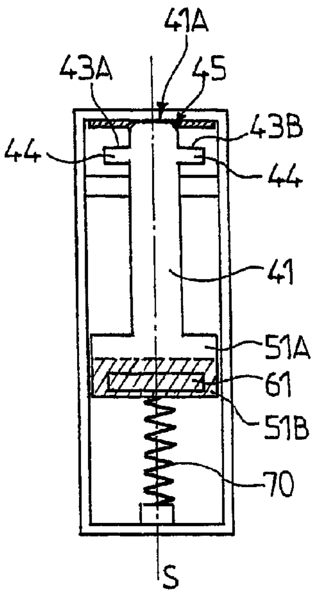
FIG. 4*c* is a diagrammatic view showing a system for indicating the state of two varistors connected in parallel respectively when both varistors are disconnected.

In this exemplary embodiment, the indicator means 30 are preferably functionally connected to the first and second disconnector means 20A, 20B so as to provide differing indications about the states of each of the varistors 10 taken individually (FIGS. 4*a*, 4*b*, 4*c*).

In this exemplary embodiment, the control part 40 is preferably formed by a slider 41 provided with a front portion 41A mounted to move resiliently between:

- an initial position (FIG. 4*a*) corresponding to a state in which both protection components are connected, in which the slider 41 is held in position simultaneously by both of the disconnector means 20A, 20B, its front portion 41A bearing against both of them;
- an intermediate position (FIG. 4*b*) offset from the initial position, corresponding to a state in which only one of the disconnector means 20A, 20B has disconnected, in which the slider 41 is held in position by the closed disconnector means 20A; and
- a final position (FIG. 4*c*) offset relative to the intermediate position, corresponding to both disconnector means 20A, 20B being in the disconnected state. In this final position the slider 41 is not necessarily held in place by the disconnector means 20A, 20B but may come into abutment against them, as shown in FIG. 4*c*.

In this exemplary embodiment of the invention, the indicator 50 is preferably formed by an indicator member, preferably being a panel 51 mounted on or made integrally with the slider 41 and preferably located at its end remote from the front portion 41A so as to move in register with the viewing window 61.

The panel 51 is preferably divided into two zones 51A and 51B that are disposed in such a manner that when the disconnector means 20A, 20B are in the closed position (FIG. 4*a*), the zone 51A that is preferably colored green lies substantially in register with the viewing window 61. In this way, the window appears green, thus indicating that the protection components are in operation. In contrast, when both disconnector means 20A, 20B are in the open position (FIG. 4*c*), it is the other zone 51B, preferably colored red, that is in register with the window 61. In this configuration, the window 61 appears red, thus indicating that both varistors are disconnected. In the intermediate position shown in FIG. 4*b*, the window 61 is occupied simultaneously by at least a portion of each of the two zones 51A and 51B such that a portion thereof, e.g., half of its area, appears to be red while another portion or half appears to be green. The visual appearance of the window 61 thus informs third parties that only one of the varistors is disconnected.

The amplitude of the movement of the slider 41 is thus adjusted in such a manner as to generate a different visual appearance through the window 61 as a function of the configuration of the disconnector means 20A, 20B.

In the exemplary embodiment shown in FIGS. 4*a*, 4*b*, and 4*c*, the slider 41 is resiliently stressed by resilient means 70 urging it to bear via its front portion 41A against the disconnector means 20A, 20B (FIG. 4*a*).

In particularly advantageous manner, the control part 40, and specifically the slider 41, has two bearing zone stages 42 and 43 placed one behind the other in the travel direction F of the control part 40 so as to hold it successively in the initial position and in the intermediate position. The structure of the control part 40 thus serves to generate stepwise movement thereof between the initial, intermediate, and final positions.

In even more preferred manner, the control part 40 has a "downstream" pair of bearing zones 42A, 42B designed to come into abutment in the initial position (FIG. 4*a*) against the two disconnector means 20A, 20B.

The control part 40 also comprises a pair of "upstream" bearing zones 43A, 43B located upstream from the downstream pair of bearing zones 42A, 42B relative to the travel direction F of the control part 40, in such a manner that in the intermediate position (FIG. 4*b*), one of the upstream bearing zones 43A comes into abutment against the corresponding disconnector means 20A that is in the closed position.

Naturally, if the other disconnector means 20B were to be the first to open, then it would be the other upstream bearing zone 43B that would come into abutment against the corresponding disconnector means 20B.

In this configuration, the indicator means 30 advantageously present symmetry about the plane S defining the separation between the two varistors.

In more particularly advantageous manner, the upstream bearing zones 43A, 43B are preferably formed by fingers 44 projecting from opposite sides of the control part 40 and extending in a direction that is substantially perpendicular to the main travel direction F of the control part 40.

In preferred manner, the device includes means for guiding the movement of the control part 40 that are adapted to allow said part to move angularly when one of the disconnector means 20A, 20B opens, so as to allow the corresponding downstream bearing zone 42A, 42B to go past the other disconnector means 20A, 20B. The means for guiding movement are advantageously formed by the side walls 60C, 60D of the housing 60. The slider 41 is then advantageously placed inside the housing 60 in such a manner as to maintain sufficient clearance between the outline of the slider 41 and the walls 60C, 60D to allow for such angular movement.

Thus, in order to go from the initial position shown in FIG. 4*a* to the intermediate position shown in FIG. 4*b*, the slider 41 needs to go past one of the disconnector means 20A that has remained in the closed position, and to do this it must turn a little through an angle α that enables it to disengage from the disconnector means 20A. The slider 41 can then continue its stroke until the upstream bearing zone 43A comes into abutment against the disconnector means 20A.

In order to make it even easier for the slider 41 to go past the disconnector means 20A that have remained in the closed position, the slider is provided with disengagement means 45. The disengagement means 45 are preferably constituted by ramps formed on either side of the slider 41 in the vicinity of its front portion 41A, these ramps thus forming the downstream bearing zones 42A, 42B.

In the same manner as in the above-described exemplary embodiment shown in FIGS. 1 and 2, the resilient means 70 likewise serve to bring forward and make safe the disconnection of the varistors, ensuring that the front portion 41A of the slider 41 is caused to bear under stress against the disconnector means 20A, 20B.

Another exemplary embodiment of the invention is described below with reference to FIGS. 5*a*, 5*b*, and 5*c*.

In this exemplary embodiment, the indicator means 30 advantageously include guide means 80 adapted to cause the control part 40 to move along a predetermined path formed by combining a movement in rotation with a movement in translation.

The control part 40 is subjected to resilient stress by the resilient means 70 interposed between the control part 40 and an abutment 62 mounted in stationary manner within the housing 60.

Under the action of the resilient means 70, such as a spring, the control part 40 comes to bear against the disconnector means 20A, 20B. For this purpose, the control part 40 has two end portions 46A, 46B, e.g., in the form of projecting horns, adapted to bear against respective ones of the disconnector means 20A, 20B when they are both in the closed position (FIG. 5*a*).

Figure 5A:
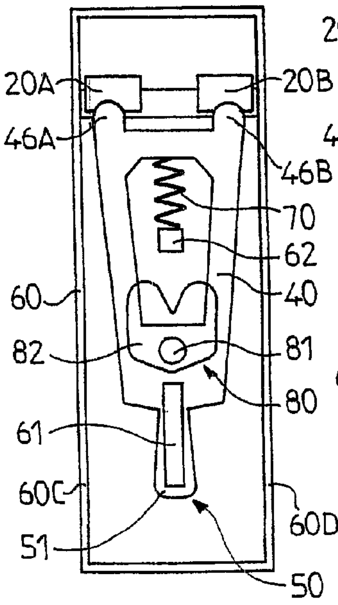
FIG. 5*a* is a diagram showing an improved variant of the system for indicating the states of two varistors connected in parallel respectively when both varistors are in service.
Figure 5B:
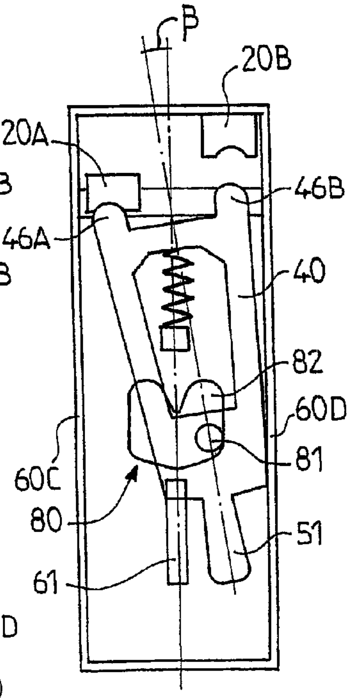
FIG. 5*b* is a diagram showing an improved variant of the system for indicating the states of two varistors connected in parallel respectively when only one of the varistors is in service.
Figure 5C:
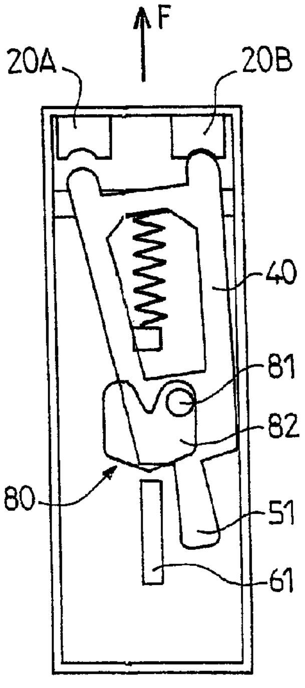
FIG. 5*c* is a diagram showing an improved variant of the system for indicating the states of two varistors connected in parallel respectively when both varistors are disconnected.

The guide means 80 of the control part 40 are advantageously formed by a stud 81, preferably placed on the control part 40, and a corresponding groove 82, preferably having a V-shape, within which the stud 81 can move when the control part 40 passes successively between its initial, intermediate, and final positions shown in FIGS. 5*a*, 5*b*, and 5*c*.

This exemplary embodiment operates as follows.

In the initial position shown in FIG. 5*a*, the control part 40 is in stable equilibrium and is interposed between the resilient means 70 and the disconnector means 20A, 20B.

When one of the disconnector means 20B moves into the open position, it releases the control part 40, at least in part, so that it then turns through an angle β until it comes into contact with one of the walls 60D of the housing 60, as shown in FIG. 5*b*.

In this intermediate position, the control part 40 is likewise in a stable position and continues to bear resiliently against the other disconnector means 20A via its end portion 46A. The displacement of the control part 40 between the initial position (FIG. 5*a*) and the intermediate position (FIG. 5*b*) follows a predetermined path that is directly associated with the path of the stud 81 within the groove 82.

In this exemplary embodiment, the indicator 50 is preferably formed by an indicator member such as a panel 51 that is preferably disposed at one of the ends of the control part 40 so as to move in register with the window 61 formed in the housing 60. Thus, in the initial position shown in FIG. 5*a*, the indicator panel 51, preferably green in color, is situated substantially in register with the window 61, thus indicating that all of the varistors are connected.

In the intermediate position shown in FIG. 5*b*, the control part 40 is offset angularly away from its initial position so that the indicator panel 51 is likewise offset away from the window 61. The window then presents a different visual appearance, indicating that one of the varistors has been disconnected. By way of example, and as shown in FIG. 4*b*, a portion of the viewing window 61 may remain masked by the control part 40, thus informing third parties that only some of the protection components are disconnected.

When the other disconnector means 20A in turn move to the open position, the control part 40 tends to move in a substantially rectilinear direction F under drive from the resilient means 70, thereby completely disengaging the viewing window 61 which then takes on a uniform visual appearance, e.g., red in color, indicating that all of the protection components are disconnected and need to be replaced.

The movement of the control part 40 between the intermediate and final positions is guided by the stud 81 co-operating with the groove 82, the stud 81 moving in substantially rectilinear manner in one of the branches of the V-shape formed by the groove 82.

Such a configuration presents the advantage of not interfering with disconnection in the event of the indicator means 30 being jammed.

Another advantage of this configuration is that it also makes it possible for the resilient means 70 to participate in disconnection by exerting thrust on the control part 40, thus encouraging the disconnector means 20A, 20B to move when the solder melts.

Another advantage of this configuration is that it is relatively insensitive to any vibration or impacts that can occur, for example during transport, since the control part 40 can always return to its initial position under the effect of the return force exerted by the resilient means 70.

Figures 6A, 6B, 6C:
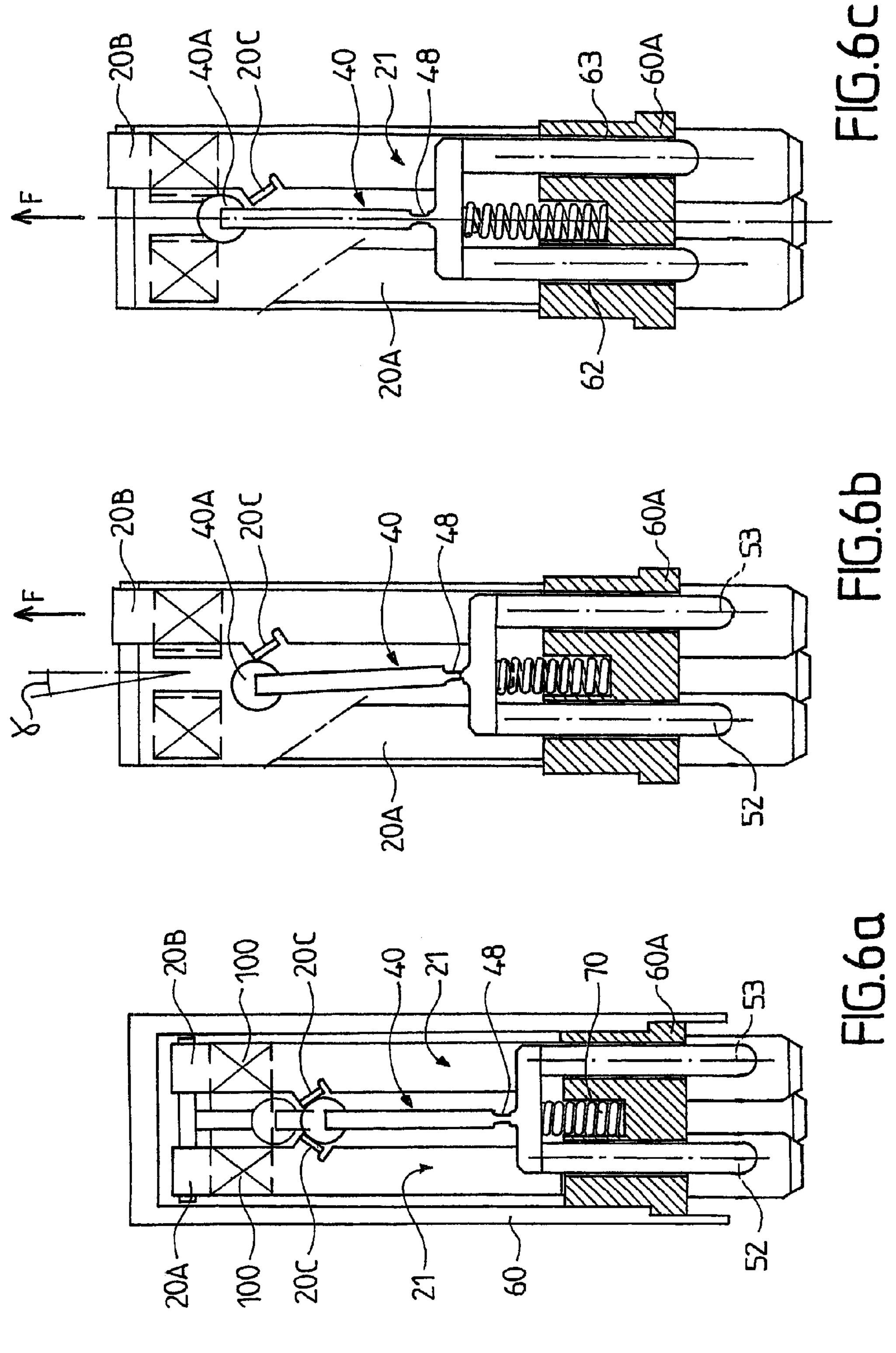
FIG. 6*a* is a diagram showing a variant of the protection device in accordance with the invention in which the device is adapted to be connected to a remote signaling system, the figure showing a first state in which both varistors are in service.
FIG. 6*b* is a diagram showing a variant of the protection device in accordance with the invention in which the device is adapted to be connected to a remote signaling system, the figure showing a second state in which one of the varistors is in service.
FIG. 6*c* is a diagram showing a variant of the protection device in accordance with the invention in which the device is adapted to be connected to a remote signaling system, the figure showing a second state in which the second of the varistors is in service.

In another exemplary embodiment of the invention shown in FIGS. 6*a*, 6*b* and 6*c*, the indicator 50 is formed by a remote indicator (not shown) that is functionally connected to the control part 40 via a remote signaling system. The indicator 50 may thus be formed by a visible indicator, an audible indicator, or by any other type of sensory indicator.

In contrast, unlike the various exemplary embodiments described above, the indicator 50 is not mechanically connected to the control part 40 but is remote therefrom, i.e., it is connected thereto by means other than mechanical means, and in particular by remote signaling means. Thus, the indicator is not situated in the direct proximity of the housing 60 but at a non-negligible distance therefrom.

This exemplary embodiment of the device is shown for two varistors connected in parallel, but it could naturally also be applied to a device having only one varistor.

In this exemplary embodiment, the control part 40 is secured to two pins 52, 53 for engaging in corresponding recesses 401, 402 formed in a socket 400 (FIG. 7) that is to receive the protection cell 1. As is well known to the person skilled in the art, the pins 52, 53 are for co-operating with a mechanism disposed within the socket 400 and suitable for tripping a microswitch so as to signal changes of state in the device to third parties situated remotely from the housing 60. Thus, when the two pins 52, 53 are in a low position corresponding to a state in which both varistors are connected (FIG. 6*a*), the mechanism and the associated remote signaling system provide a remote signal that indicates that both of the varistors of the device are connected.

In contrast, when one of the varistors is disconnected, as shown in FIG. 6*c*, both pins 52, 53 move to a high position, thereby generating electrical signals suitable for indicating remotely that at least one of the varistors of the device is disconnected.

According to a particularly advantageous characteristic of the invention, the control part 40 is secured to the pins 52, 53 in such a manner that movement thereof leads simultaneously to substantially identical movement of the pins 52, 53 within passages 62, 63 formed through the bottom wall 60A of the housing 60.

In particularly advantageous manner, the control part 40 can be formed by a slider, preferably being in the form of an elongate rod provided with a front portion 40A in the form of a disk or a sphere for bearing against a fold 20C formed in the disconnector means 20A, 20B and designed to constitute an abutment against the control part 40.

On opening, the disconnector means 20A, 20B release the control part 40, thus allowing it to move freely. Otherwise, when the disconnector means 20A, 20B are in the closed position (FIG. 6*a*), the control part 40 is under stress between the resilient means 70 urging it in the direction F, and the disconnector means 20A, 20B, and more precisely the folds 20C formed thereon.

The folds 20C preferably extend in a plane that is substantially perpendicular to the plane in which the disconnector blades 21 extend. In even more preferable manner, the folds 20C may extend obliquely relative to the disconnector blades 21, such that the front portion 40A of the control part 40 exerts driving stress thereagainst tending to push the disconnector blades 21 towards their open positions.

The control part 40 and the associated resilient means 70 then constitute means for providing assistance in disconnecting the protection components of the device.

In particularly advantageous manner, the control part 40 is sufficiently flexible to allow its front portion 40A to move angularly. As shown in FIGS. 6*a*, 6*b*, and 6*c*, the folds 20C formed on the disconnector means 20A, 20B project so as to form abutments against the front portion 40A of the control part 40. Thus, when one of the disconnector means 20A goes to the open position, the control part 40, and specifically the front portion 40A thereof, needs to disengage from the projecting portion of the fold 20C of the disconnector means 20B that has remained in the closed position so as to be able to go past it. The lateral flexibility of the control part 40 then allows it to move angularly sufficiently to enable its front portion 40A to go past the abutment formed by the fold 20C under drive from the resilient means 70. In particularly advantageous manner, the control part 40 includes a narrowing 48 in its section imparting flexibility thereto.

The operation of the device is described below with reference to FIGS. 6*a*, 6*b*, and 6*c*.

When both disconnector means 20A, 20B, and specifically the disconnector blade 21, are in the closed position, as shown in FIG. 6*a*, the control part 40 is advantageously resiliently stressed between the resilient means 70 and the disconnector means 20A, 20B, and more precisely the abutment formed by their folds 20C. As soon as one of the disconnector means 20A, 20B opens, e.g., the disconnector means 20A, the control part 40 is released and driven to move by the resilient means 70. The control part 40 then moves in the main direction F together with a small amount of angular offset $\gamma$ so as to disengage from the disconnector means 20 that has remained in the closed position with its fold 20C projecting against the front portion 40A of the control part 40. Once the control part 40 has gone past this obstacle it is free to move towards its final position shown in FIG. 6*c*.

On moving from the initial position towards the final position, the control part 40 simultaneously entrains the pins 52, 53 out form their recesses 401, 402 within the socket 400, thus causing a new signal to be triggered remotely indicating that at least one of the varistors of the device is disconnected.

Figure 8:
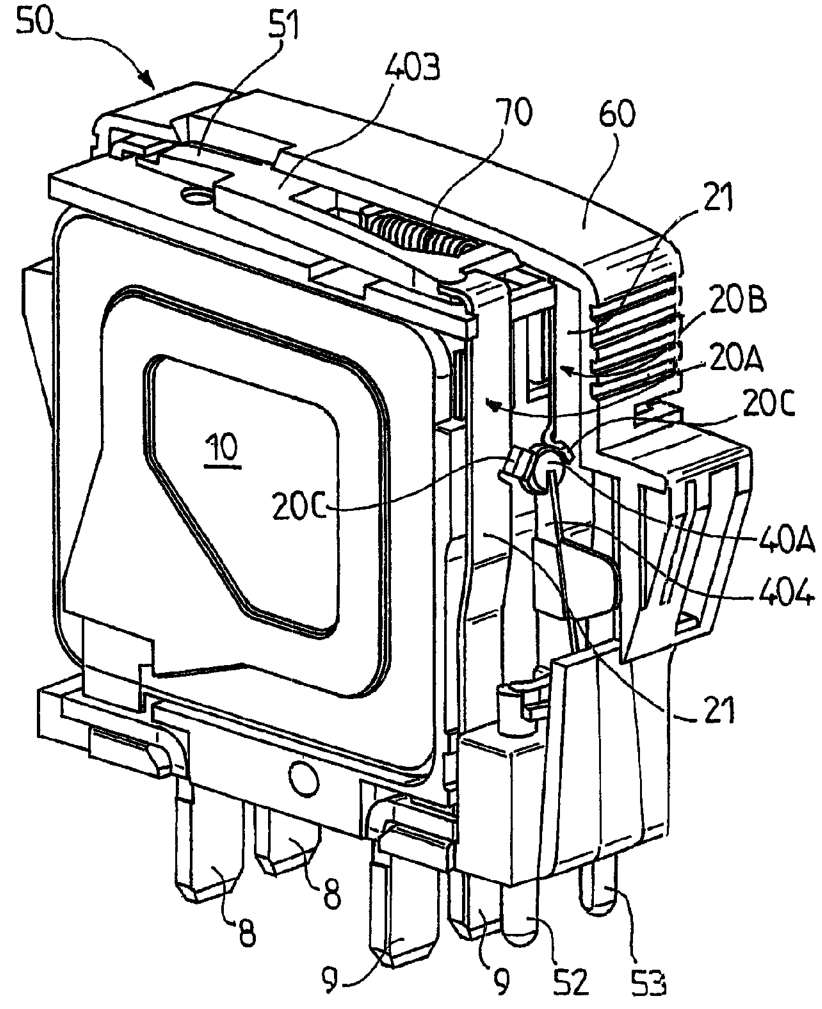
FIG. 8 is a perspective view showing a preferred embodiment of the protection device in accordance with the invention combining a direct indicator member and an indicator for signaling remotely.

In an even more preferred embodiment of the invention, as shown in FIG. 8, the device comprises a plurality of indicator means, i.e., both direct indicator means and remote indicator means.

For this purpose, the device comprises a first control part 403 associated with a direct indicator member such as an indicator panel 51, and also a second control part 404 associated with a remote-signaling indicator (not shown), the first and second control parts 403, 404 being adapted to co-operate independently from each other with the disconnector means 20A, 20B. Thus, the configuration associating the first control part 403 with the direct indicator member could be of the type shown in FIGS. 1, 2, 4*a*, 4*b*, 4*b*, 5*a*, 5*b*, 5*c*. The configuration associating the second control part 404 with the remote-signaling indicator may be of the type shown in FIGS. 6*a*, 6*b*, 6*c*.

In this embodiment of the invention, opening the disconnector means 20A, 20B leads almost simultaneously to the release of the first and second control parts 403, 404, thereby indicating that at least one varistor is disconnected, both by means of the indicator panel 51 and by means of the remote-signaling indicator.

Such a device thus makes it possible within a single housing 60 to associate two distinct control parts 403, 404 suitable for actuating two complementary indicator means concerning the state of the protection components, i.e., proximity indicator means e.g., in the form of an indicator panel 51, and remote indicator means, advantageously in the form of a remote-signaling indicator, e.g., a visible indicator an audible indicator.

The protection device in accordance with the invention thus makes it possible by means of a particularly simple configuration of the indicator means 30 to provide not only reliable and effective disconnection of the varistors when they are in a degraded state, but also makes it possible simultaneously for a third party to see the state of the varistors, while also limiting any risk of the mechanism ceasing or indeed any problems associated with guiding the parts.

Because of the small area of contact between the functional parts, any risk of one part becoming jammed by another is significantly reduced.

The application of the invention lies in electrical devices for providing protection against transient voltage surges.

The invention claimed is:

1. A device for protecting an electrical installation against voltage surges, comprising:

a) two protection components in parallel;

b) each protection component being provided with a respective disconnector means for disconnecting the protection component from the electrical installation and suitable for moving between a closed position in which the protection component is connected, and an open position in which the protection component is disconnected; and c) indicator means for indicating the state of the protection component, functionally connected to the disconnector means, the indicator means comprising i) at least one control part distinct from the disconnector means and suitable for moving under the dependency thereof, and ii) at least one indicator for indicating the state of the protection component and associated with the control part in such a manner that the indicator indicates whether the protection component is in operation or disconnected, as a function of the position of the control part, wherein the indicator means is functionally connected to the disconnector means for providing distinguishable indications about the state of each of the protection components taken individually, wherein the control part and the disconnector means are relatively disposed in such a manner that, during opening of the disconnector means, the disconnector means release the control part thus allowing the control part to move, and wherein the control part is mounted to move resiliently between an initial position, an intermediate position and a final position, wherein:

the initial position corresponds to a state in which both protection components are connected, the control part being held in said initial position by both disconnector means;

the intermediate position is offset from the initial position and corresponds to a state in which only one of the disconnector means is in the open position, the control part being held in said intermediate position by the disconnector means that is in the closed position; and the final position is offset from the intermediate position and corresponds to a state in which both of the disconnector means are in the open position.

2. The device of claim 1, wherein, in the closed position, the disconnector means are mounted so as to form an abutment against the control part.

3. The device of claim 1, wherein the control part and the disconnector means are disposed in such a manner that when the disconnector means are in the closed position, the control part is resiliently stressed and comes to bear against the disconnector means, thereby exerting driving stress thereagainst, tending to push the control part and the disconnector means towards the open position.

4. The device of claim 1, wherein the control part is constituted by a slider suitable for moving in a substantially rectilinear direction and having a front portion designed to bear against the disconnector means.

5. The device of claim 3, wherein the indicator means include resilient means adapted to exert a return force on the control part for causing the controller part to move.

6. The device of claim 1, wherein the control part includes two stages of bearing zones disposed one behind the other in the travel direction of the control part so as to hold the control part successively in the initial position and in the intermediate position.

7. The device of claim 1, wherein the control part includes a pair of downstream bearing zones for coming into abutment in the initial position against the two disconnector means, and a pair of upstream bearing zones disposed upstream from the first pair of downstream bearing zones in the travel direction of the control part, in such a manner that, in the intermediate position, one of the upstream bearing zones comes into abutment against the corresponding disconnector means that has remained in the closed position.

8. The device of claim 7, wherein the upstream bearing zones are formed by fingers projecting from either side of the control part and extending in a direction that is substantially perpendicular to the main travel direction of the control part.

9. The device of claim 7, wherein the device includes means for guiding the movement of the control part, said means being adapted to allow said control part to move angularly sufficiently on one of the disconnector means opening to allow the other disconnector means to be passed by the corresponding disconnector means of the downstream bearing zones.

10. The device of claim 9, wherein the control part is provided with disengagement means arranged, on the control part going from the initial position towards an intermediate position, to facilitate going past the disconnector means that has remained in the closed position.

11. The device of claim 10, wherein the disengagement means are formed by ramps formed on either side of the control part at the end thereof, and constituting the downstream bearing zones.

12. The device of claim 1, wherein the device includes guide means adapted to cause the control part to move along a predetermined path formed by a combination of a movement in rotation and a movement in translation.

13. The device of claim 12, wherein the guide means are formed by a stud placed on the control part and a corresponding V-shaped groove within which the stud can move.

14. The device of claim 1, wherein the indicator is formed by at least one indicator member, preferably an indicator panel, associated with the control part in such a manner as to move in register with a window formed in the housing of the device so as to obtain a different visual appearance through the window as a function of the position of the control part.

15. The device of claim 1, wherein the indicator is constituted by a remote indicator, functionally connected to the control part via a remote-signaling system.

16. The device of claim 15, wherein the control part is sufficiently flexible to allow its front portion to move angularly.

17. The device of claim 16, wherein the control part includes a narrowing of section imparting a flexible nature to the control part.

18. The device of claim 15, wherein the front portion of the control part is in the form of a sphere for bearing against a fold formed in the disconnector means, said fold being designed to form an abutment against the control part.

19. The device of claim 1, wherein the protection component is formed by a varistor.

20. The device of claim 1, wherein each disconnector means is formed by a disconnector blade soldered to one of the poles of the corresponding protection component, and is suitable for moving under the force of resilient return drive from the closed position to the open position after the solder has melted, thereby releasing the control part.

21. The device of claim 1, further comprising a first control part associated with a direct indicator member, and a second control part associated with a remote-signaling indicator, the first and second control parts being adapted to co-operate independently of each other with the disconnector means.

22. The device of claim 2, wherein the control part and the disconnector means are disposed in such a manner that when the disconnector means are in the closed position, the control part is resiliently stressed and comes to bear against the disconnector means, thereby exerting driving stress thereagainst, tending to push the disconnector means toward the open position.

23. The device of claim 4, wherein the indicator means include resilient means adapted to exert a return force on the control part for causing the control part to move.

24. The device of claim 8, wherein the device includes means for guiding the movement of the control part, said means being adapted to allow said control part to move angularly sufficiently on one of the disconnector means opening to allow the other disconnector means to be passed by the corresponding disconnector means of the downstream bearing zones.

* * * * *